(12) United States Patent
Jacob

(10) Patent No.: US 9,513,870 B2
(45) Date of Patent: Dec. 6, 2016

(54) MODULO9 AND MODULO7 OPERATION ON UNSIGNED BINARY NUMBERS

(71) Applicant: Dialog Semiconductor GmbH, Kirchheim/Teck-Nabern (DE)

(72) Inventor: Stanly Jacob, Munich (DE)

(73) Assignee: Dialog Semiconductor (UK) Limited, Reading (GB)

( * ) Notice: Subject to any disclaimer, the term of this patent is extended or adjusted under 35 U.S.C. 154(b) by 317 days.

(21) Appl. No.: 14/258,664

(22) Filed: Apr. 22, 2014

(65) Prior Publication Data

US 2015/0301800 A1 Oct. 22, 2015

(51) Int. Cl.
*G06F 7/72* (2006.01)
*G06F 7/38* (2006.01)

(52) U.S. Cl.
CPC ............... *G06F 7/38* (2013.01); *G06F 7/727* (2013.01)

(58) Field of Classification Search
None
See application file for complete search history.

(56) References Cited

U.S. PATENT DOCUMENTS

| | | | |
|---|---|---|---|
| 3,816,728 A | 6/1974 | Chen et al. | |
| 5,499,299 A * | 3/1996 | Takenaka | G06F 7/728 380/28 |
| 6,609,141 B1 * | 8/2003 | Montague | G06F 7/721 708/491 |
| 6,694,344 B1 | 2/2004 | Gerwig et al. | |
| 6,991,176 B1 | 1/2006 | Schwenk et al. | |
| 2006/0184600 A1 * | 8/2006 | Maruo | G06F 7/729 708/491 |
| 2010/0023571 A1 * | 1/2010 | Furukawa | G06F 7/728 708/491 |
| 2013/0311532 A1 * | 11/2013 | Olsen | G06F 9/30025 708/491 |
| 2015/0301800 A1 * | 10/2015 | Jacob | G06F 7/727 708/491 |

* cited by examiner

*Primary Examiner* — David H Malzahn
(74) *Attorney, Agent, or Firm* — Saile Ackerman LLC; Stephen B. Ackerman

(57) ABSTRACT

Simultaneous results of modulo7 and modulo9 operations on an unsigned binary number N are achieved by dividing N by a number d, d being power of 2 then the resulting quotient and remainder are used to calculate modulo 7 and modulo9 by repeatedly split-and accumulate operations. The solution allows shared use of a significant amount of logic components, by a scalable architecture modulo7 and modulo9 can be found on large numbers and allows flexible use if only modulo7 or only modulo9 calculation is required.

28 Claims, 11 Drawing Sheets

MODULO9 AND MODULO7 OPERATION ON UNSIGNED BINARY NUMBERS

TECHNICAL FIELD

The present document relates to Modulo operation using digital circuits. In particular, the present document relates to a scheme for obtaining simultaneous results of Modulo9 and Modulo7 operation on unsigned binary numbers using common logic components.

BACKGROUND

Brief Background on Binary System:

In digital systems, unsigned numbers are represented in binary format. In binary format, a number is represented as a sequence of "1"s and/or "0"s. Since binary number system is a base 2 system (as compared to decimal system where the base is 10), each digit (called as bit) of the binary number, going from right to left, represents an increasing power of 2. The right most bit (referred as Least Significant Bit and abbreviated as LSB in this document) represents $2^0$, the following bit represents $2^1$ and so on. The left most bits is referred as Most Significant Bit. In this document, binary numbers will be represented with N'b prefix. For example 3'b011 represents a binary number which has three bits and these bits are 0, 1 and 1 (reading from left to right). Likewise in this document numbers with N'd prefix indicates that a decimal number is represented in N bit binary form. For example 4'd9, indicates decimal 9 represented in 4-bit binary form.

To find the decimal equivalent of a number represented in binary format, we have to just compute the sum of the product of the bit and the power of 2 that the particular bit position represents. Two examples of converting binary number to decimal equivalent are given below $$3'b101=1\times2^2+0\times2^1+1\times2^0=5 \text{ (in decimal)}$$

$$5'b10010=1\times2^4+0\times2^3+0\times2^2+1\times2^1+0\times2^0=18 \text{ (in decimal)}$$

Since the binary format is a base 2 system, quotient and remainder resulting by a division of the number by power of 2 is inherently embedded in the number. For example, the remainder resulting from division of an N-bit number by 8 ($2^3$) is obtained by simply separating the least significant 3 bits from the rest the number. The quotient of this division would be the most significant 'N−3' bits. In this document, we use the following notations for quotient and remainder:

$q_d$—Quotient of division of an unsigned number by divisor d.

$r_d$—Reminder of division of an unsigned number by divisor d.

FIG. 1 shows the quotient and remainder when an N-bit unsigned number is divided by a divisor which is a power of 2 (d=2,4,8,16,32,64 . . . etc.), i.e. FIG. 1 illustrates quotients ($q_d$) and remainders ($r_d$) resulting from division of an N-bit number by a power of 2(d=2,4,8,16,32,64).

Modulo 9 and Modulo 7 on Unsigned Numbers:

Modulo operation is the process of finding the remainder of a division operation. The result of the modulo operation is often termed "modulo X". Therefore 'modulo X' represents the remainder when a number is divided by "X".

In this document, 'modulo 9' represents remainder when an unsigned number is divided by 9. Similarly 'modulo 7' represents remainder when an unsigned number is divided by 7.

Modulo Operation:

In digital circuits, modulo operation, where divisor is a power of 2, is straight forward and is done by simply picking out the relevant number of lower bits as depicted in FIG. 1. However since 9 and 7 are not powers of 2, the modulo9 and modulo7 operation is not simple and straight forward and results in extensive and often complex digital logic implementations. Moreover, separate logic circuits are commonly required for modulo9 and modulo7 calculations.

It is a challenge for designers of logic circuits to design a simple and scalable scheme and implementation for calculating modulo9 and modulo7 on unsigned binary numbers.

SUMMARY

A principal object of the present disclosure is to achieve a simple and scalable scheme of calculating modulo9 and modulo7 on unsigned binary numbers.

A further object of the present disclosure is to achieve a scheme for modulo operation using simple adders, simple subtractors (optional) and comparators.

A further object of the present disclosure is to achieve a scheme for modulo operation which can be implemented using very few lines of HDL (Hardware Description Language).

A further object of the present disclosure is to achieve a scheme for modulo operation which is area efficient and can be beneficial to silicon area sensitive designs.

A further object of the present disclosure is to achieve a scheme for modulo operation which uses basic adders/Subtractors and logic gates, which are part of standard ASIC vendor libraries and Field Programmable Gate Arrays (FPGAs), that can be easily implemented on almost all digital ASIC and FPGAs.

A further object of the present disclosure is to achieve a scheme for modulo operation which is scalable, i.e. if a dividend has a large value (e. g. a number requiring 64 bits to be represented).

In accordance with the objects of this disclosure a method to obtain simultaneous results of modulo7 and modulo9 operation on an unsigned number N has been achieved. The method disclosed comprises, firstly the steps of: (1) providing a circuitry comprising full adders or logic gates capable of performing full-addition operations, (2) representing the unsigned number N in binary format, and (3) finding a common multiple M of 9 and 7 which is the closest to a number d, which is a power of 2. Furthermore the method comprises the steps of (4) determining Lrem such that 0≤Lrem≤M, by application of split-and-accumulate method multiple times if required, wherein division of N by d (N/d) is performed by splitting binary representation of N into quotient $q_d$ and remainder $r_d$, and subsequently adding them together to form the intermediate sum '$q_d+r_d$'; thereafter if this intermediate sum can be greater than M, split-and-accumulate method is applied again on the sum '$q_d+r_d$', this done repeatedly till the resulting sum '$q_d+r_d$' is assured to be less than or equal to M, at which point Lrem is assigned the value of this sum '$q_d+r_d$' (5) determining N modulo7 according to equation N modulo7=(Lrem) modulo 7 by one or more split-and-accumulate operations, and (6) determining N modulo9 according to equation N modulo9=(Lrem) modulo 9 by one or more split-and-accumulate operations.

In accordance with the objects of this disclosure a circuit to obtain simultaneous results of modulo7 and modulo9 operation on an unsigned binary number N has been achieved. The circuit disclosed comprises a circuitry capable of calculating Lrem such that 0≤Lrem≤M, wherein M is a multiple of 9 and 7 which is the closest to the number d, which is a power of 2, wherein the circuitry comprises full adders or logic gates configured to calculate Lrem using repeatedly a split-and accumulate method till Lrem is less than or equal to the number M, a circuitry capable of calculating N modulo7 based on the value of said Lrem, wherein the circuitry comprises full adders, a comparator, and a multiplexer configured to perform a split operation to find a quotient $q_8$ and a remainder $r_8$ of a division by 8, followed by an accumulate operation adding quotient $q_8$ and remainder $r_8$ to get a binary interim result IR1, furthermore followed by a second split-and-accumulate operation wherein the most significant bit of IR1 is added to the first three bits (Least significant three bits) of IR1 to get an interim value IR2, wherein, if IR2 has a value of 3d'7, N modulo 7 is zero, else Nmodulo 7 equals IR2, and a circuitry capable of calculating N modulo9, based on the split operation to find the quotient $q_8$ and the remainder $r_8$ of a division by 8 calculated by the circuitry capable of calculating N modulo 7, wherein the circuitry capable of calculating N modulo9 comprises a comparator and subtractors and is configured, if the quotient $q_8$ is greater than the remainder $r_8$ to calculate N modulo9=9-($q_8$-$r_8$), else to calculate N modulo9=$r_8$-$q_8$.

In accordance with the objects of this disclosure a circuit to obtain simultaneous results of modulo7 and modulo9 operation on an unsigned binary number N has been achieved. The circuit disclosed comprises a circuitry capable of calculating Lrem such that 0≤Lrem≤M, wherein M is a multiple of 9 and 7 which is the closest to the number d, which is a power of 2, wherein the circuitry comprises full adders or logic gates configured to calculate Lrem using repeatedly a split-and accumulate method till Lrem is less than or equal to the number M, a circuitry capable of calculating N modulo7 based on the value of said Lrem, wherein the circuitry comprises full adders, a comparator, and a multiplexer configured to perform a split operation to find a quotient $q_8$ and a remainder $r_8$ of a division by 8, followed by an accumulate operation adding quotient $q_8$ and remainder $r_8$ to get a binary interim result IR1, furthermore followed by a second split-and-accumulate operation wherein the most significant bit of IR1 is added to the first three bits (Least significant three bits) of IR1 to get an interim value IR2, wherein, if IR2 has a value of 3d'7, N modulo 7 is zero, else N modulo 7 equals IR2, and a circuitry capable of calculating N modulo9, based on the split operation to find the quotient $q_8$ and the remainder $r_8$ of a division by 8 calculated by the circuitry capable of calculating N modulo 7, wherein the circuitry capable of calculating N modulo9 comprises a comparator, full adders and a 4-bit 2's complement generator, and is configured, if $q_8$ is greater than the remainder $r_8$ to calculate N modulo9=q'$_8$+($r_8$+4'd9), wherein q'$_8$ represents the 4-bit 2's complement of $q_8$, or, if $q_8$ is smaller than or equal to the remainder $r_8$ then to calculate N modulo9=$r_8$+q'$_8$, wherein any fifth bit resulting from addition operations in calculation of Nmodulo9 is ignored (See FIG. 5)

BRIEF DESCRIPTION OF THE FIGURES

The invention is explained below in an exemplary manner with reference to the accompanying drawings, wherein.

DETAILED DESCRIPTION

Figure 1:
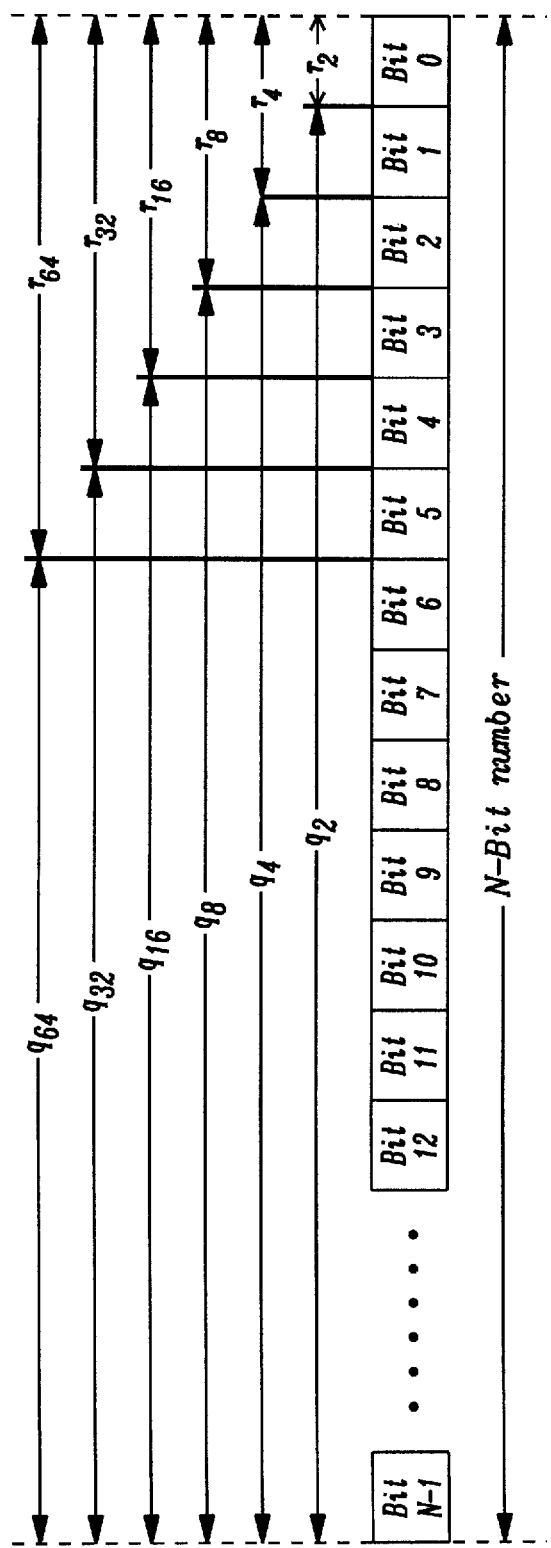
FIG. 1 shows the quotient $q_d$ and remainder $r_d$ when an N-bit unsigned number is divided by a divisor which is a power of 2 (d=2,4,8,16,32,64 . . . etc.).

In this document, a simple and scalable scheme of calculating modulo9 and modulo7 on unsigned number is presented. The scheme makes use of simple adders, simple subtractors (optional) and comparators. The scheme presented is very easy to comprehend and implement. It can be implemented using very few lines of Hardware Description Language (HDL) as e.g. Verilog. Since it uses a significant part of common logic for calculation of modulo9 and modulo7, it is area efficient and can be beneficial to silicon area sensitive designs. Since the scheme presented in this disclosure uses basic adders, Subtractors and logic gates that are part of standard ASIC vendor libraries and FPGAs, this solution can be easily implemented on almost all digital ASIC and FPGAs.

The scheme is very flexible for use, for e.g. In designs, which need only modulo9 (or only modulo7) to be calculated, a small part of logic can be removed to achieve just modulo9 (or modulo7). For designs, which need simultaneous calculations of modulo9 and modulo7, the scheme disclosed can be used to get a full solution.

Furthermore the scheme is scalable, i.e. if a dividend has a large value (e.g. a number requiring 64 bits to be represented in binary form), the scheme presented can be successfully scaled as explained in Example 2.

Mathematically, the result of a modulo9 operation on an unsigned number "N" is the remainder when N is divided by 9. In this document modulo9 operation on N is written as "N modulo9". For example: 20 modulo9=2; 100 modulo9=1.

Similarly, result of a modulo7 operation on an unsigned number "N" is the remainder when N is divided by 7. In this document modulo7 operation on N is written as "N modulo7". For example 20 modulo7=6; 100 modulo7=2.

In this document, a scheme is described to find results of modulo9 and modulo7 operation on an N-bit unsigned number represented in binary format. To explain the concept behind the scheme presented in this document, first modulo7 and modulo9 operation are explained using analogies.

Analogy and Explanation:

Assuming we have "N" objects (say N oranges), mathematically performing a modulo9 operation on N, means basically dividing these "N" objects into groups of 9 objects till we are left with less than 9 objects. The number of such leftover objects is the result of modulo9 operation on N.

As an example if we have 100 oranges, we would keep making groups of 9 oranges till we are left with less than 9 oranges. The number of left over oranges would be the result of modulo9 operation on 100. In this case of 100 oranges, the number of left over oranges would be 1, since we would have successfully made 11 groups of 9 oranges from the original 100 oranges.

From the above example it would be obvious that we could obtain the same result by dividing the 100 oranges into groups of an integer multiple of 9 (for example 18 or 27) then finding modulo9 on the leftover from this division. For example if we were to divide 100 oranges into groups of 18, we would be left with 10 oranges since we would have made 5 groups of 18 oranges. Now if we do a modulo9 operation on the leftover 10 oranges, this would yield the same result of 1. Mathematically, it means 100 modulo9=(100 modulo18) modulo9, or generally, if "A" is an positive integer multiple of 9, then, $$N \bmod 9 = (N \bmod A) \bmod 9 \quad (1)$$

Equation 1 can be explained as follows: To find modulo9 on N, divide N into groups of A (where A is a positive integer multiple of 9) objects, and then find modulo 9 on left over objects.

Extending the example of 100 oranges to modulo7 operation, in order to find modulo7 on 100, we would keep making groups of 7 oranges till we are left with less than 7 oranges. The number of left over oranges would be the result of modulo7 operation. In this case of 100 oranges, the number of left over orange would be 2, since we would have successfully made 14 groups of 7 oranges from the original 100 oranges.

Based on same arguments as explained in case of modulo9, equation 1 can also be applied for modulo7 operation, with "B" representing an integer multiple of 7. Thus equation 1 can be re-written as $$N \bmod 7 = (N \bmod B) \bmod 7 \quad (2)$$

Equation 2 can be explained as follows: To find modulo7 on N, divide N into groups of B (where B is a positive integer multiple of 7) objects, and then find modulo 7 on left over objects.

Consequences of Equations (1) and (2) will be used in describing the scheme presented in this disclosure.

Steps to Find Modulo9 and Modulo7:

In order to simultaneously find results of modulo9 and modulo7 operation on an unsigned number N represented in binary format, this disclosure uses the following steps.

1. First find a common multiple of 7 and 9 which is closest to power of 2. For simplicity, we choose the number 63, since the number 63 is closest to the number 64, which is a power of 2.

2. From the analogy presented above and consequences of equations 1 and 2, we can reach the inference given in equations 3 and 4. i.e.

$$N \bmod 9 = (N \bmod 63) \bmod 9 \quad (3)$$

and $$N \bmod 7 = (N \bmod 63) \bmod 7 \quad (4)$$

In equation 3 and 4, 'N modulo63' represents the remainder of division N/63.

In terms of analogy, it represents the number of objects left over after maximum number of 'group of 63' objects have been removed from the initial N objects.

In line with the above, in the scheme disclosed here, we find the number left over after virtually removing 'groups of 63' until we are left with 63 or less. This left-over number is referred as 'Lrem' in this disclosure. Again, based on equation 3 and 4, in order to find modulo9 and modulo7 results on N, it is sufficient to perform modulo9 and modulo7 operation on Lrem.

It may be noted that the result of 'Nmodulo63' (used in equations 3 and 4) is a value between (and including) 0 and 62 i.e. 0≤Nmodule63<63. However based on the implementation of the scheme proposed in this disclosure, Lrem can also take a value of 63 i.e. 0≤Lrem≤63. The fact that Lrem can also take a value of 63, will not affect the final results of Nmodulo9 and Nmodulo7 operation, since it simply implies that after removing 'groups of 63' the leftover number (Lrem) may happen to be just sufficient to form the last 'group of 63'. If Lrem happens to be 63, the modulo9 and modulo7 operation would return a result of 0 based on the circuits implemented in this disclosure. Therefore, performing modulo9 and modulo7 operation on Lrem would give the same result as performing these operations directly on N or (Nmodulo63). Based on the above arguments, equation 3 and 4 can be written as $$N \bmod 9 = (L\text{rem}) \bmod 9 \quad (5)$$

and $$N \bmod 7 = (L\text{rem}) \bmod 7 \quad (6)$$

3. Next step is to find Lrem. To find Lrem, the quotient and remainder from the division of N by 64 is added together repeatedly, till the sum is less than or equal to 63. In this disclosure, this method of adding quotient and remainder is called "split-and-accumulate". An application of "split-and-accumulate" method to find Lrem is described below, and also elaborated in concept and implementation in FIGS. 2a and 2b.

Figure 2A:
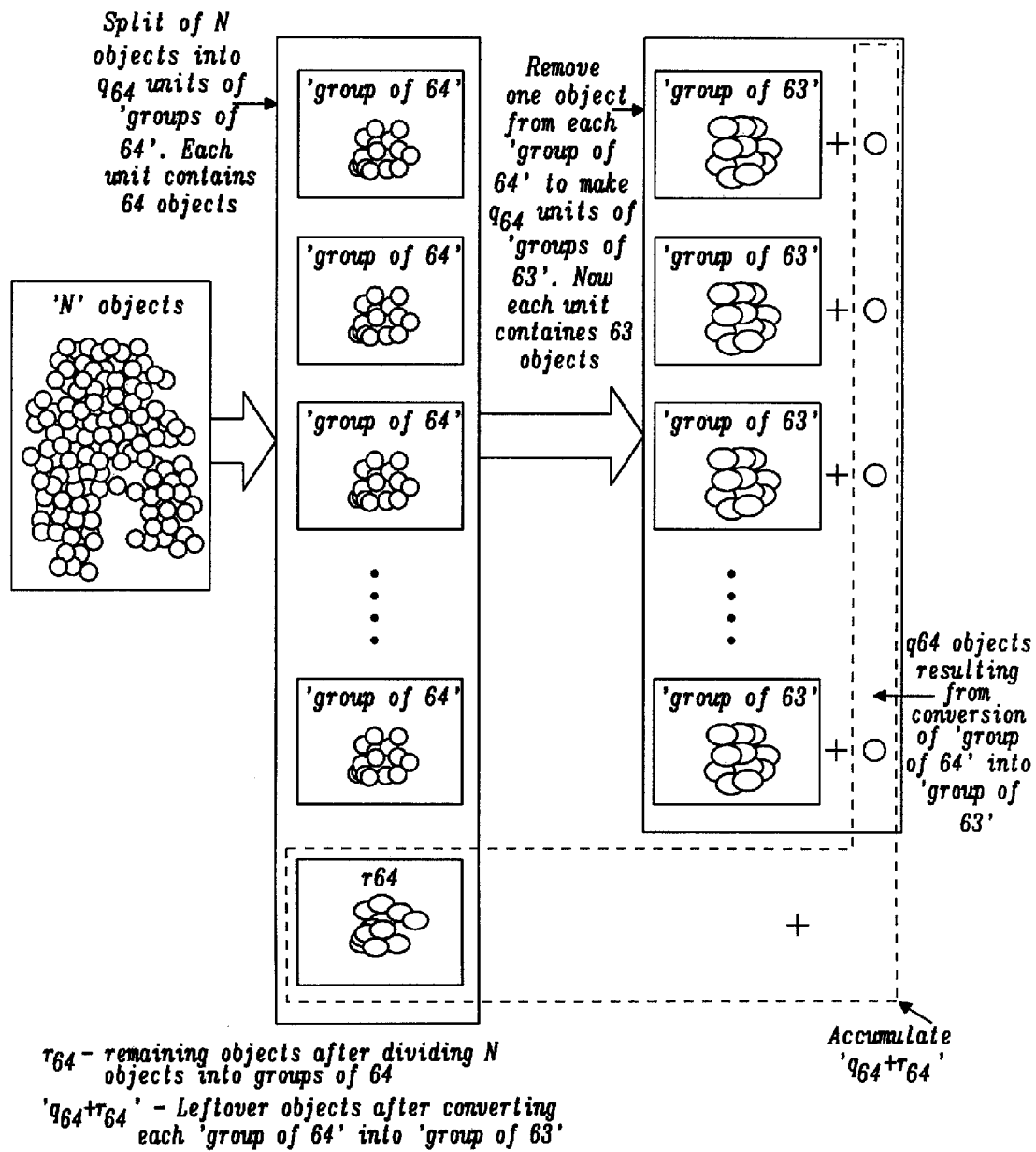
FIG. 2a demonstrates a 'split-and-accumulate' concept, where N objects can be 'split' into 'group of 64' objects and subsequent 'accumulate' operation leads to conversion of 'group of 64' into 'group of 63' objects.

FIG. 2a demonstrates a 'split-and-accumulate' concept, where N objects can be 'split' into 'group of 64' objects and subsequent 'accumulate' operation leads to conversion of 'group of 64' into 'group of 63' objects.

Figure 2B:
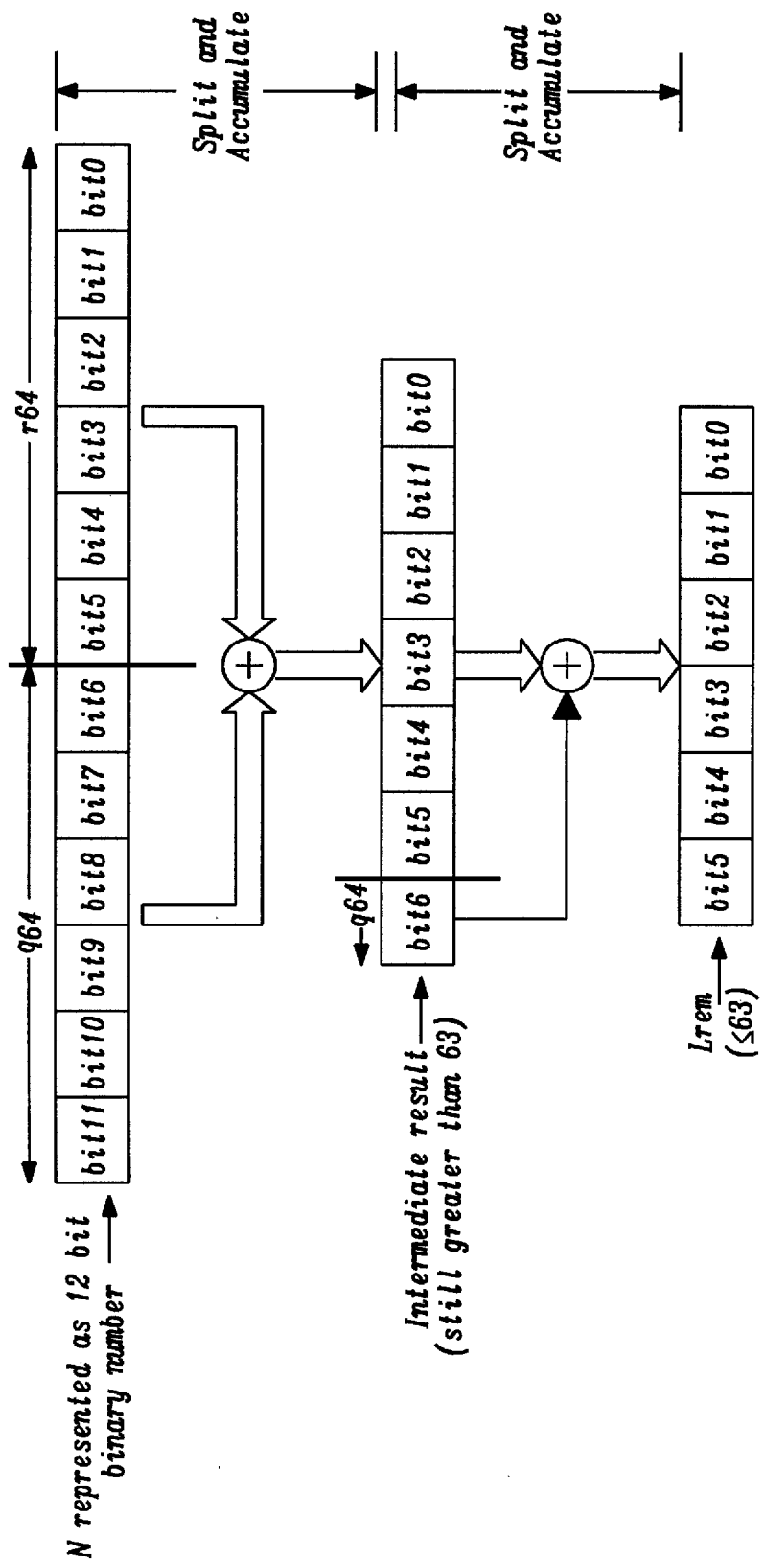
FIG. 2b illustrates an implementation of 'split-and-accumulate' in digital form for a 12 bit binary number. It illustrates how split-and-accumulate operation is done on a 12 bit unsigned number to effectively divide it by 63 until the left over number (Lrem) is less than or equal to 63.

FIG. 2b illustrates an implementation of 'split-and-accumulate' in digital form for a 12 bit binary number. It illustrates how split-and-accumulate operation is done on a 12 bit unsigned number to effectively divide it by 63 until the left over number (Lrem) is less than or equal to 63.

When we divide a number by 64, we are in fact dividing the number into groups of 64 (See Analogy and Explanation section described above). The number of such groups formed is the quotient of division, and the number of leftovers (less than 64) after forming the groups is called the remainder. Following the nomenclature of FIG. 1, $q_{64}$ is the quotient of this division and $r_{64}$ is the remainder of this division. As demonstrated in FIG. 2a, In terms of analogy it means that the division of N objects by 64 resulted in $q_{64}$ units (each unit being a 'group of 64' objects), and $r_{64}$ was the number of leftover objects after forming these $q_{64}$ units. If we remove 1 object from each of the $q_{64}$ units, each of these 'group of 64 objects' will be converted to a 'group of 63 objects'. Thus, after removing 1 object from each of the $q_{64}$ units we have transformed each unit into a 'group of 63 objects', and are left with additional $q_{64}$ objects. Effectively, we have formed $q_{64}$ units of 'group of 63 objects' and are now left with '$q_{64}+r_{64}$' objects (FIG. 2a diagrammatically illustrates the split-and-accumulate operation). If resulting '$q_{64}+r_{64}$'>63, it means we can form more units of 'group of 63 objects' from the remaining '$q_{64}+r_{64}$' objects. Hence we apply 'split-and-accumulate' method again on the '$q_{64}+r_{64}$' objects, to form additional units of 'group of 63 objects'. We apply 'split-and-accumulate' method repeatedly until the resulting '$q_{64}+r_{64}$' is assured to be less than or equal to 63.

Thus by repeatedly splitting (separating quotient $q_{64}$ and remainder $r_{64}$) and accumulating (adding $q_{64}$ and remainder $r_{64}$) we have divided the N objects into groups of 63' and found the leftover which is no more than 63 objects. We have termed this final number of left over objects as Lrem. i.e. 0≤Lrem≤63. From equations 5 and 6, in order to find Nmodulo9 and Nmodulo7, we need to do modulo7 and modulo9 on Lrem.

Thus 'split-and-accumulate', is an effective, simple and innovative way which can be applied to divide the original number N by 63 and find the remainder Lrem, such that Lrem is less than or equal to 63.

As described earlier. On large values of N the 'split-and-accumulate' method is performed multiple times till the resulting sum is less than or equal to 63 (i.e. it can be represented in 6 bits in binary format). Therefore Lrem is found by repeated application of "split-and-accumulate" till the final result is a value less than or equal to 63 (i.e. 0≤Lrem≤63).

4. After finding Lrem, (which is less than 64), modulo9 and modulo7 operations are performed on Lrem. Since Lrem is less than 64, and hence represented by a 6 bit number, it is relatively simple to find the result of modulo7 and modulo9 on Lrem.

5. Next steps involve finding modulo7 and modulo9 on Lrem.

Figure 3:
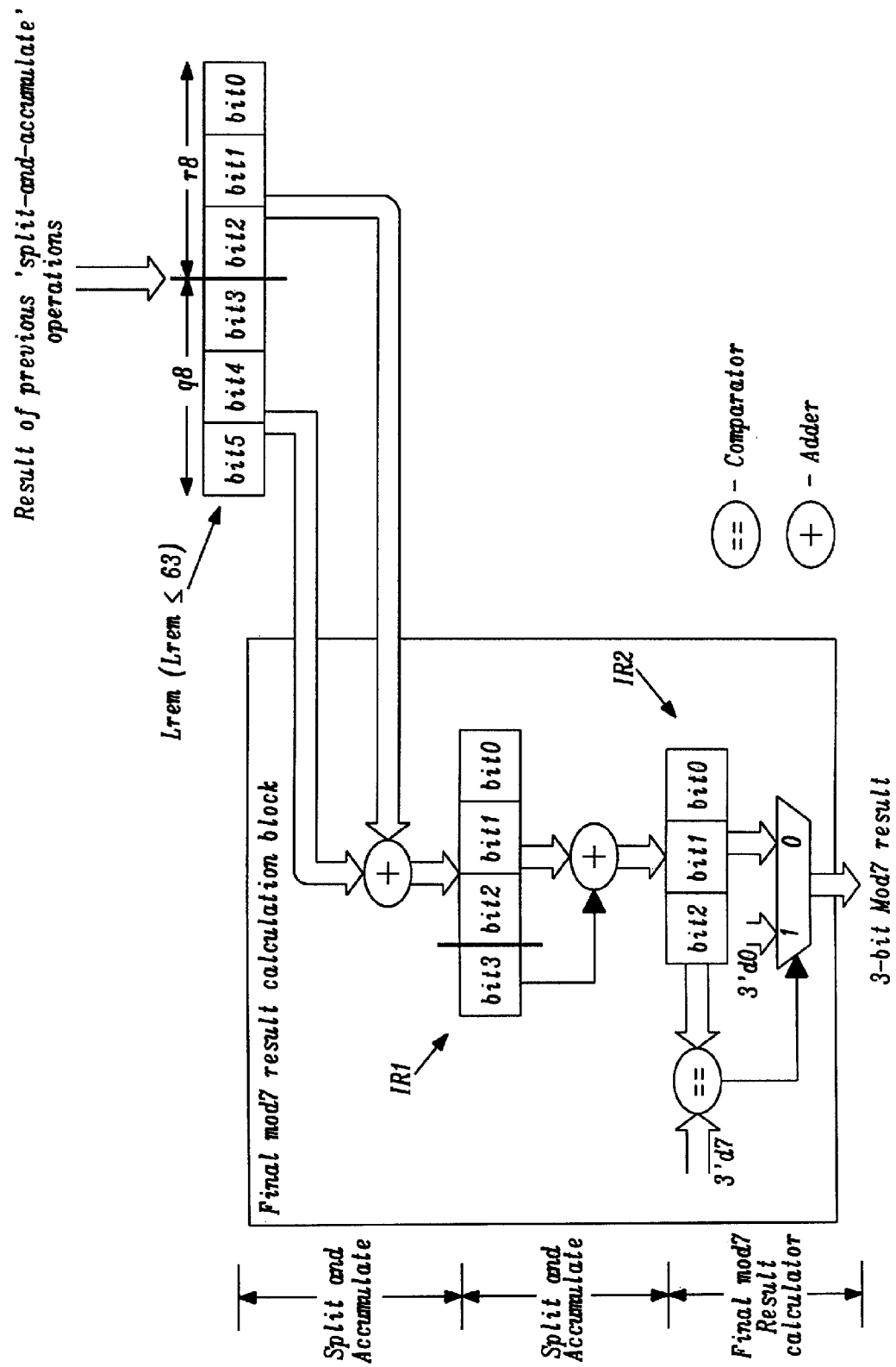
FIG. 3 depicts finding modulo7 on Lrem through further 'split-and-accumulate' and finally using a comparator and multiplexer

A) Finding Modulo7:

For finding modulo7 on Lrem, we do a 'split-and-accumulate' on Lrem as shown in FIG. 3.

In the split-and-accumulate on Lrem, for finding modulo7, we first do a split to find $q_8$ and $r_8$. The accumulate operation results in IR1. Following this we do a second split-and-accumulate to find the final 3-bit value IR2. If the IR2 value is 3'b111, then the modulo7 result is 0, else the modulo7 result is given by the 3-bit value of IR2. This final evaluation is done by a simple comparator and multiplexer, as shown in FIG. 3.

Analogy and Explanation for Step 5A:

Since Lrem is a 6-bit value, it represents number of objects which is less than 64 (i.e. 0≤Lrem≤63). The task is to find modulo7 on this 6-bit number. In order to do this, Lrem is split in the middle. The most significant 3-bits ($q_8$), represents the number of 'group of 8' objects. The least significant 3 bits ($r_8$) represents leftover after forming $q_8$ such groups. Now from each of the $q_8$ 'groups of 8' we remove 1 object and add to the left-over $r_8$ objects. Thus the sum of $q_8+r_8$, which is referred as IR1 in FIG. 3, is the result of a first "split-and-accumulate" operation. From the above explanation, it is clear that IR1 represents the number of leftover objects after $q_8$ 'group of 7' were formed. Since $q_8$ and $r_8$ can have a maximum value of 7(3'b111), IR1 can have a maximum value of 14, which will be represented in 4-bit binary as 4'b1110.

If the most significant bit (bit3) of IR1 is 1, it indicates that there are more than 7 objects leftover after dividing Lrem into 'group of 7' objects. In this case, another split-and-accumulate operation is done to remove one more 'group of 7'. After this split-and-accumulate the number of leftovers will be less than or equal to 7. This is indicated by IR2.

If IR2 is less than 7 (3'b111), it would be the result of the modulo7 operation. However if IR2 is equal to 7(3'b111), we know that it is a perfect multiple of seven and hence modulo7 operation should result in 0. This final operation on IR2 is implemented using a simple three bit comparator and a multiplexer.

Figure 4:
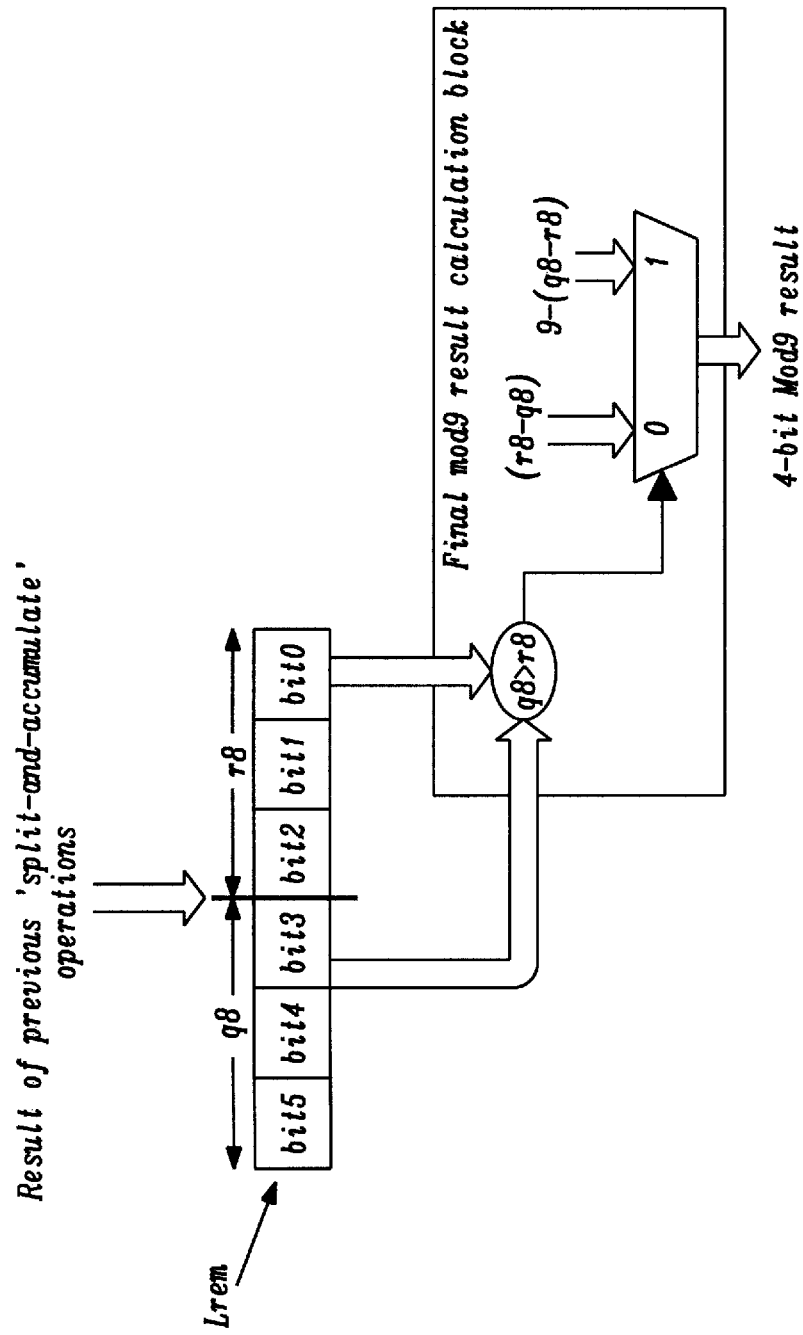
FIG. 4 shows finding modulo9 on Lrem using $q_8$ and $r_8$ from split operation and then using a simple comparator and subtraction logic.

B) Finding Modulo9:

For finding modulo9, $q_8$ and $r_8$ results from previous split operation of Lrem are used as shown in FIG. 4.

If $q_8$ is greater than $r_8$, then the modulo9 is the result of subtracting the difference $q_8-r_8$ from 9. On the other hand if $q_8$ is less than or equal to $r_8$, modulo9 result is simply the difference $r_8-q_8$.

As seen in FIG. 4, a simple three bit comparator is used to compare $q_8$ with $r_8$, and the output of the comparator is used to select the final modulo9 result.

Analogy and Explanation for Step 5B:

Since Lrem is a 6-bit value it represents number of objects which is less than 64. The task is to find modulo9 on this 6-bit number. In order to do this, Lrem is split in the middle. The most significant 3-bits ($q_8$), represents the number of 'groups of 8 objects'. The least significant 3 bits ($r_8$) represent leftover after forming $q_8$ groups.

In order to find the result of modulo9, first $q_8$ is compared with $r_8$. The idea is to find if the number of 'group of 8 objects' is less than or equal to the number of leftover objects.

Case 1 ($r_8>=q_8$): If $r_8>=q_8$, it indicates that there are lesser (or equal) number of 'group of 8' than the left over number of objects. In such a scenario, each of the 'group of 8' can take 1 object from $r_8$ to make itself a 'group of 9'. Therefore after $q_8$ groups take 1 object each from $r_8$, the number of left over objects would be $r_8-q_8$. This is in fact the result of the modulo9 operation (i.e. divide Lrem into groups of nine and find the leftover)

Case 2 ($r_8<q_8$): If $r_8<q_8$, it indicates that there are more number of 'groups of 8' than the left over number of objects. In such a scenario, each of the $r_8$ objects can be assigned to a 'group of 8' thereby transforming the recipient 'group of 8' into 'group of 9'. This would mean there are few 'group of 8' left and their precise number is ($q_8-r_8$). In other words, the difference ($q_8-r_8$), indicates the number of 'groups of 8' which fell short by 1 in order to make itself a 'group of 9'. This implies, if '$q_8-r_8$' objects were available, it would have made Lrem an integer multiple of 9. Therefore, the modulo9 result on Lrem in this case would be 9−($q_8-r_8$).

Figure 5:
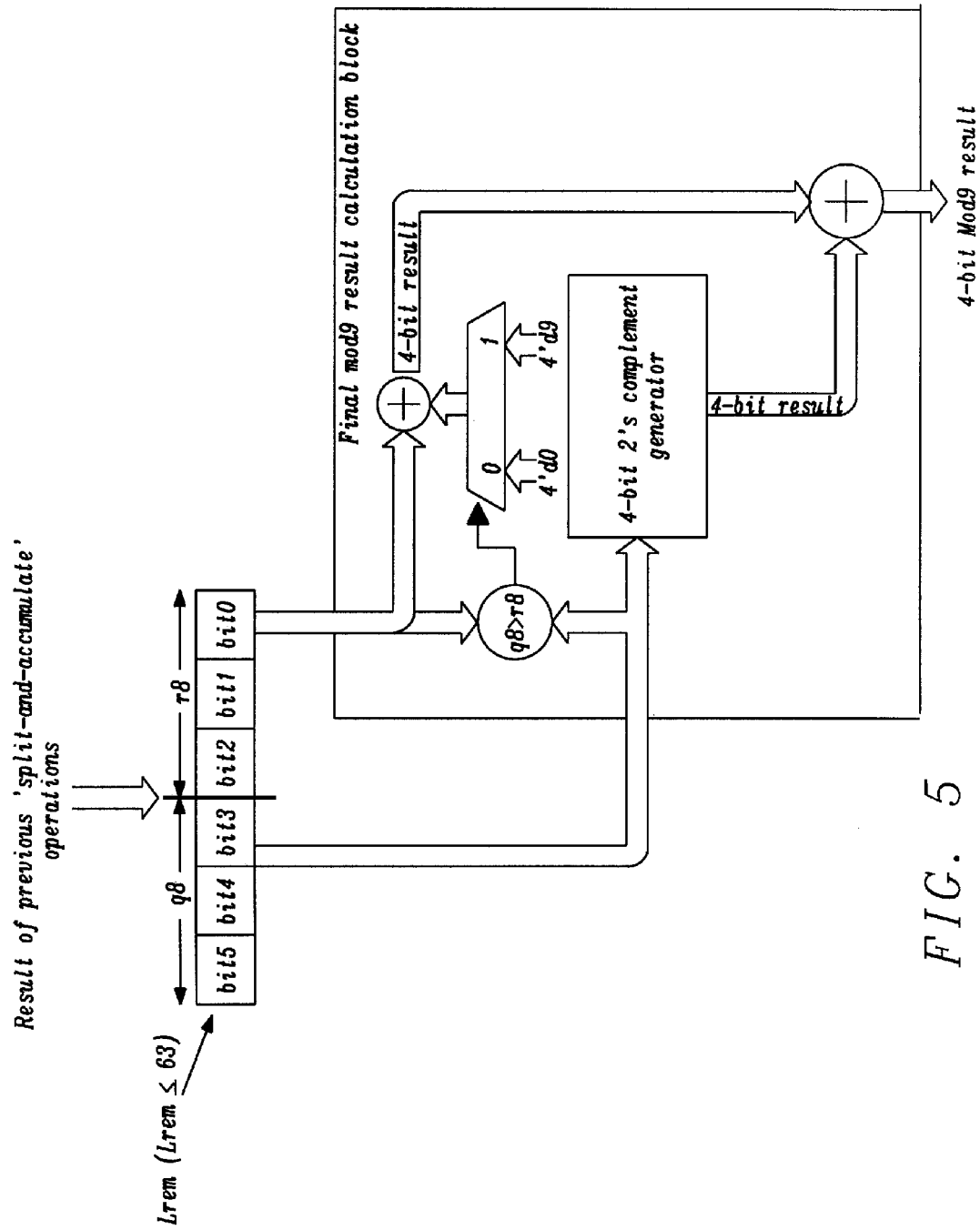
FIG. 5 illustrates an alternative scheme of finding modulo9 on Lrem without using subtractors.

C) Alternative Realization for Modulo9 Calculation Block:

FIG. 5 shows an alternative realization of modulo9 operation using inverters and adders. This is possible, because subtraction in binary arithmetic can be achieved through addition of 2's complement of the number.

Explanation for Alternative Realization for Modulo9 Calculation Block:

As seen in FIG. 4, when r8>=q8, modulo9 result is $r_8-q_8$. If we make use of 2's complement arithmetic, and if $q'_8$ represents the 2's complement of $q_8$ then $$r_8-q_8=r_8+(q'_8) \quad (7)$$

here $q'_8=2^4-q_8$.

As shown in FIG. 5, the output ($q'_8$) of the 2's complement generator is 2's complement of $q_8$ in 4-bits.

So, as seen in FIG. 5, when $r_8 \geq q_8$, 4'd0 is added to $r_8$ and the result is added to the output of 2's complement generator ($q'_8$). This is effectively $r_8 - q_8$ as given in equation 7.

However when $r_8 < q_8$, As seen in FIG. 4, the modulo9 result is $9-(q_8-r_8)$.

Re-writing, $$9-(q_8-r_8)=9+r_8-q_8$$

i.e. $9-(q_8-r_8)=9+r_8+q'_8$   (8)

here $q'_8$ represents 2's complement of $q_8$ in 4-bits. Therefore equation (8) can be re-written as below $$9-(q_8-r_8)=q'_8+(r_8+4'd9)$$   (9)

This is realized as shown in FIG. 5, i.e. when $r_8 < q_8$, 4'd9 is added to $r_8$, and the resulting sum is added to $q'_8$, thereby giving accurate result as expected in equation 9. Note that any fifth bit resulting from the addition operations in equation 7 or 9 are ignored.

APPLICATION EXAMPLES

Example 1

Finding result of a modulo9 and modulo7 operation on a 12-bit unsigned number 'N' represented in binary format.

Figure 6:
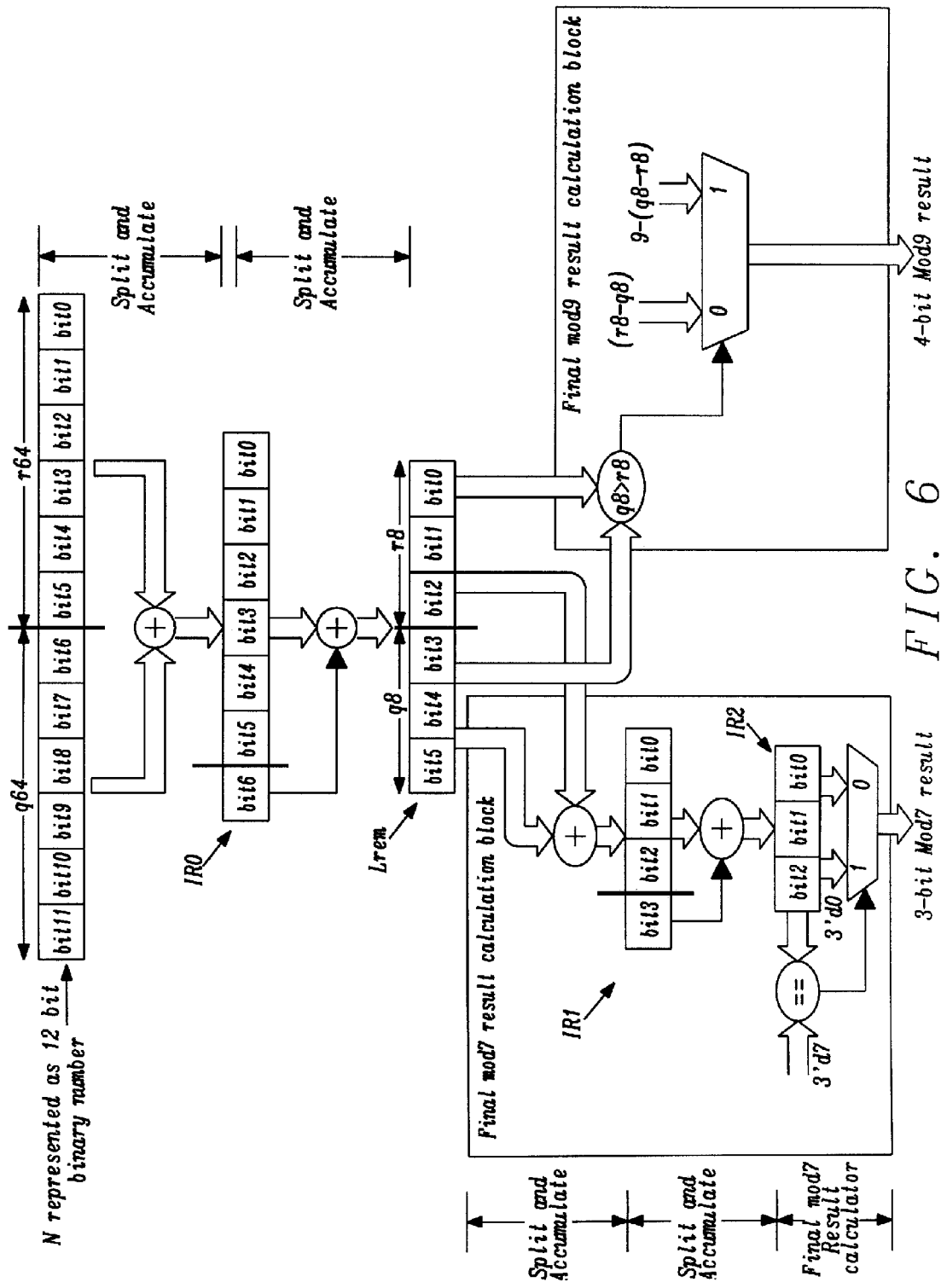
FIG. 6 depicts a diagrammatic representation of the scheme disclosed for finding modulo9 and modulo7 on a 12 bit unsigned binary number.

The realization based on the scheme disclosed is illustrated in FIG. 6 showing a diagrammatic representation of the scheme disclosed for finding modulo9 and modulo7 on a 12 bit unsigned binary number.

Explanation and Example Verilog Code: (Refer FIG. 6)
1. Lrem is found using 'split-and-accumulate' technique as explained above. First 'IR0' is obtained by adding $q_{64}$ and $r_{64}$. Since the resulting sum IR0 can still be greater than 63, we do a 'split-and-accumulate' again on IR0 to obtain Lrem. Since $q_{64}$ and $r_{64}$ can only take a maximum value of 63 each, the resulting sum IR0 can take a maximum value of 126. The number 126 is represented in binary as 7'b1111110. Consequently, adding the most significant bit of IR0 (IR0[6]) to the remaining 6 bits of IR0 (IR0[5:0]) will not result in an overflow. Therefore Lrem will have a maximum value of 63 and hence can be represented as 6-bit binary value. The Lrem value so obtained is in accordance with what is described in point 3 under "Steps to find modulo9 and modulo7".
2. On the 6-bit Lrem value so obtained, modulo7 and modulo9 operations are realized as explained in points 5A and 5B under "Steps to find modulo9 and modulo7".
3. The outputs are 3-bit modulo7 and 4-bit modulo9 results.

Example Explained with Numerical Values: (See FIG. 6)
Assume that N=3121 (decimal value). In binary, 3121 it would be represented as 12'b 110000110001. Therefore IR0 is 6'b110000+6'b110001=7'b1100001.
Lrem is obtained by adding the IR0[6] to IR[5:0].
Therefore Lrem=6'b100001+1'b1=6'b100010
Obtaining Modulo7 from Lrem:
IR1 is obtained by adding $q_8$ and $r_8$ of Lrem.
Therefore IR1=3'b100+3'b010=4'b0110
IR2 is obtained by adding IR1[3] with IR1[2:0]
Therefore IR2=3'b110+1'b0=3'b110.
Since IR2≠3'b111, 3 bit modulo7 result is 3'b110.
3'b110 is 6 in decimal which is consistent with the expected result!

Obtaining Modulo9 from Lrem:
First we compare $q_8$ and $r_8$ of Lrem. Since $q_8$(3'b100) is greater than $r_8$(3'b010), the final result is obtained by subtracting ($q_8-r_8$) from 9.

$(q_8-r_8)$=3'b100−3'b010=3'b010.

Therefore 9−($q_8-r_8$)=4'b1001−3'b010=4'b 0111.
Hence the 4-bit result of modulo9 operation is 4'b0111.
4'b0111 is 7 in decimal which is consistent with the expected result!

Verilog Code for Example 1

```
module modulo9_7 ( input [11:0] N,
    output wire [3:0] modulo9_result ,
    output wire [2:0] modulo7_result);
// Split-and-accumulate for finding Lrem
//------------------------------------------------------------
wire [6:0]IR0 = N[5:0] + N[11:6];
wire [5:0]Lrem = IR0[5:0] + IR0[6];
//------------------------------------------------------------
wire [2:0] q8 = Lrem[5:3];
wire [2:0] r8 = Lrem[2:0];
//------------------------------------------------------------
//Block to calculate modulo7
//------------------------------------------------------------
wire [3:0] IR1 = q8 + r8;
wire [2:0] IR2 = IR1[2:0] + IR1[3];
assign modulo7_result[2:0] = ( IR2 == 3'd7 ) ? 3'd0 : IR2;
//------------------------------------------------------------
//Block to calculate modulo9
//------------------------------------------------------------
    wire q8_gt_r8 = (q8>r8) ? 1'b1 : 1'b0;
    wire [2:0] r8_minus_q8 = r8[2:0] − q8[2:0];
    wire [3:0] nine_minus_q8_minus_r8 = 4'd9 − (q8 −r8);
    assign modulo9_result[3:0] = q8_gt_r8 ? nine_minus_q8_minus_r8
    : {1'b0,r8_minus_q8};
//------------------------------------------------------------
endmodule
```

Example 2

Figure 7:
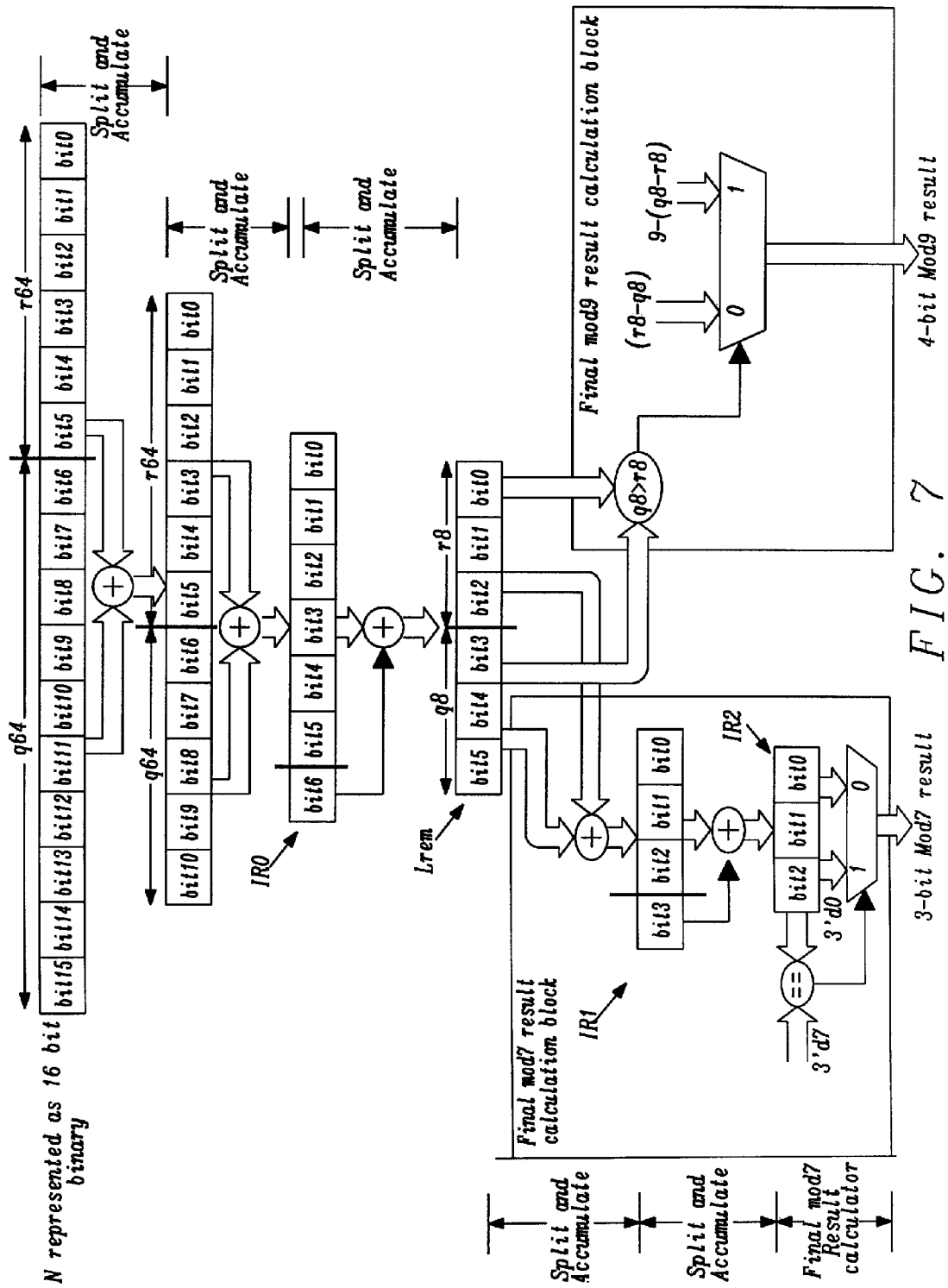
FIG. 7 illustrates a diagrammatic representation of the scheme disclosed for finding modulo9 and modulo7 on 16 bit unsigned binary number, to demonstrate scalability of the scheme disclosed.

See FIG. 7

Example 2, shows finding results of modulo9 and modulo7 operation on a 16-bit unsigned number (shown as 'N16' in FIG. 7) represented in binary format. To find modulo9 and modulo7 on a 16 bit unsigned number, the same technique as disclosed in this document is applied. Since 'N16' is large Lrem is obtained by doing split-and-accumulate three times. The solution is illustrated in FIG. 7 showing a diagrammatic representation of the scheme disclosed for finding modulo9 and modulo7 on 16 bit unsigned binary number.

Verilog Code for Example 2:

```
module modulo9_7_16bit ( input [15:0] N16,
    output wire [3:0] modulo9_result ,
    output wire [2:0] modulo7_result);
// First split-and-accumulate
wire [10:0] N = N16[15:6] + N16[5:0];
// Split-and-accumulate for finding Lrem
//------------------------------------------------------------
wire [6:0]IR0 = N[5:0] + N[10:6];
wire [5:0]Lrem = IR0[5:0] + IR0[6];
//------------------------------------------------------------
wire [2:0] q8 = Lrem[5:3];
wire [2:0] r8 = Lrem[2:0];
//------------------------------------------------------------
//Block to calculate modulo7
//------------------------------------------------------------
wire [3:0] IR1 = q8 + r8;
wire [2:0] IR2 = IR1[2:0] + IR1[3];
assign modulo7_result[2:0] = ( IR2 == 3'd7 ) ? 3'd0 : IR2;
```

-continued

```
//---------------------------------------------------------------
//Block to calculate modulo9
//---------------------------------------------------------------
    wire q8_gt_r8 = (q8>r8) ? 1'b1 : 1'b0;
    wire [2:0] r8_minus_q8 = r8[2:0] - q8[2:0];
    wire [3:0] nine_minus_q8_minus_r8 = 4'd9 - (q8 -r8);
    assign modulo9_result[3:0] = q8_gt_r8 ? nine_minus_q8_minus_r8
        : {1'b0,r8_minus_q8};
//---------------------------------------------------------------
endmodule
```

Comparative Results:

In order to bring out the benefits of the split-and-accumulate scheme disclosed for computation of modulo9 and modulo7, digital implementation using this scheme is compared with other common methods of implementation. In order to facilitate comparison, a digital logic block which computes modulo9 and modulo7 on a 16 bit unsigned number is implemented in Verilog using the following ways.

1. Using the split-and-accumulate method disclosed.
2. Using modulo operator available in Verilog Hardware Description Language . . . (In Verilog HDL, symbol for modulo operator is '%').
3. Using instantiation of Synopsys Designware component.

Figure 8:
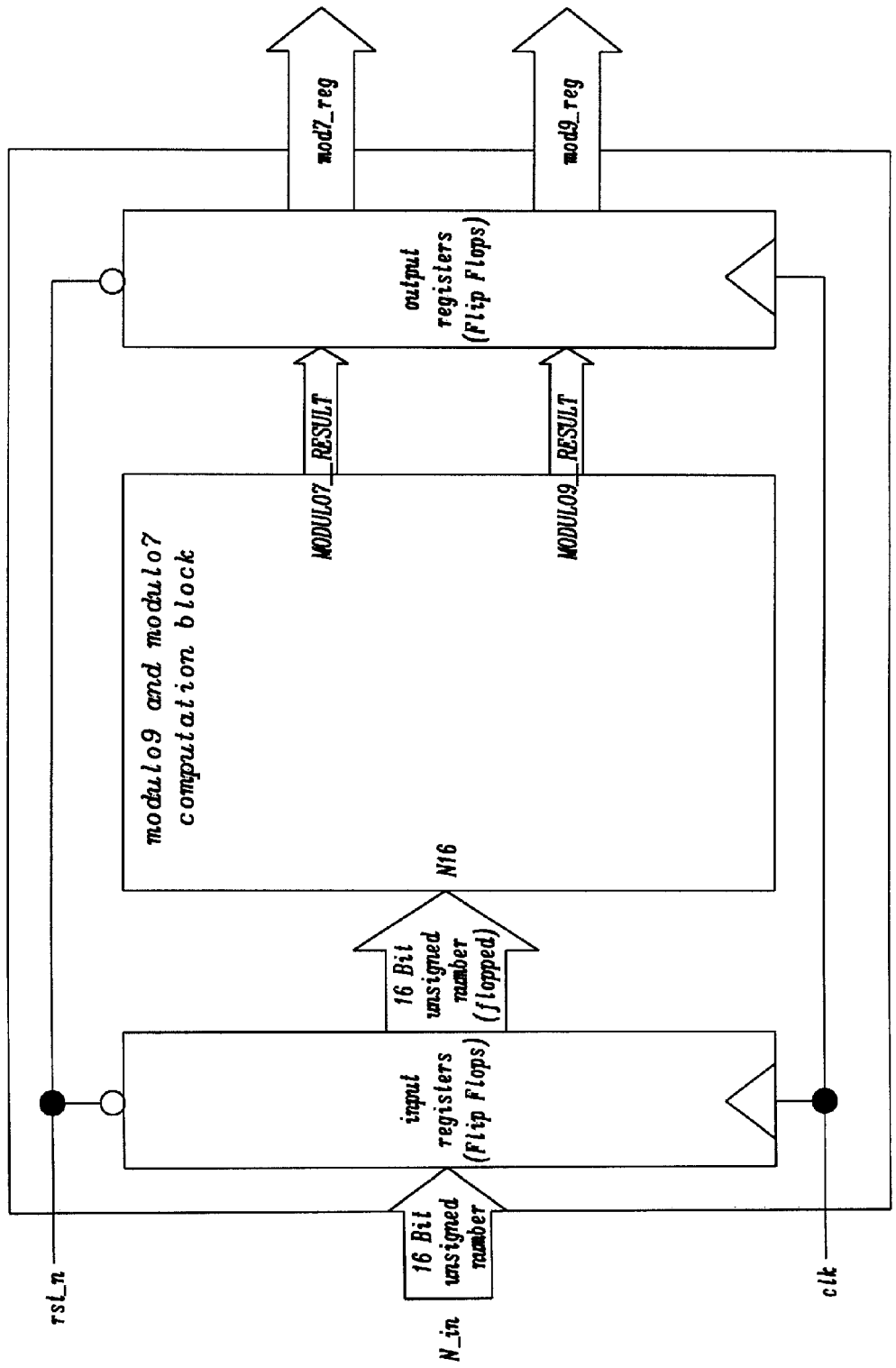
FIG. 8 illustrates a common architecture used for the three Verilog implementations. These Verilog implementations are used for comparative analysis of synthesis results.

For comparison purposes, All the three implementations (1, 2 and 3) follow the same architecture as shown in FIG. 8, and are implemented in Verilog HDL. The purpose is to compare the implementation based on the split-and-accumulate scheme (1) against other common methods (2 and 3).

As shown in FIG. 8, the 16 bit unsigned input is registered (using 16 D-type flip flops) and then presented to the core logic which computes the modulo7 and modulo9 results. The results are then registered again using the output stage flip flops.

For comparison all the three implementations were coded in Verilog and similar constraints were applied to synthesize the Verilog code into target library cells. For this study, same version of design compiler tool from Synopsys was used for synthesis and was targeted to 250 nm technology library. The Verilog code and the synthesis constraints applied for the three implementations are given below. As it can be seen, similar synthesis constraints are applied to the three implementations.

1A Example Verilog Code and Synthesis Constraints for Implementation Using Split-and-Accumulate Scheme Disclosed:

```
module modulo97_sa_top
    (input clk, input rst_n, input [15:0] n_in,
        output reg [3:0] mod9_reg, output reg [2:0] mod7_reg
    );
reg [15:0] N;
always@(posedge clk or negedge rst_n)
    begin
        if (!rst_n)
            N <= 16'd0;
        else
            N <= n_in;
    end
wire [3:0] mudulo9_result;
wire [2:0] mudulo7_result;
modulo97_split_accumulate m97_sa (.N16(N),
.modulo9_result(mudulo9_result),
.modulo7_result(mudulo7_result));
always@(posedge clk or negedge rst_n)
    begin
        if (!rst_n)
            begin mod9_reg <= 4'd0 ; mod7_reg <= 3'd0; end
        else
            begin
                mod9_reg <= mudulo9_result ;
                mod7_reg <= mudulo7_result;
            end
    end
endmodule.
module modulo97_split_accumulate ( input [15:0] N16,
                                    output wire [3:0] modulo9_result ,
                                    output wire [2:0] modulo7_result);
// First split-and-accumulate
wire [10:0] N = N16[15:6] + N16[5:0];
// Split-and-accumulate for finding Lrem
//---------------------------------------------------------------
wire [6:0]IR0 = N[5:0] + N[10:6];
wire [5:0]Lrem = IR0[5:0] + IR0[6];
//---------------------------------------------------------------
wire [2:0] q8 = Lrem[5:3];
wire [2:0] r8 = Lrem[2:0];
//---------------------------------------------------------------
//Block to calculate modulo7
//---------------------------------------------------------------
wire [3:0] IR1 = q8 + r8;
wire [2:0] IR2 = IR1[2:0] + IR1[3];
assign modulo7_result[2:0] = ( IR2 == 3'd7 ) ? 3'd0 : IR2;
//---------------------------------------------------------------
//Block to calculate modulo9
//---------------------------------------------------------------
    wire q8_gt_r8 = (q8>r8) ? 1'b1 : 1'b0;
    wire [2:0] r8_minus_q8 = r8[2:0] - q8[2:0];
    wire [3:0] nine_minus_q8_minus_r8 = 4'd9 - (q8 -r8);
    assign modulo9_result[3:0] = q8_gt_r8 ? nine_minus_q8_minus_r8
        : {1'b0,r8_minus_q8};
//---------------------------------------------------------------
endmodule
```

Essential Design Compiler Constraints for Synthesis:
remove_design-all
set search_path ".$LIB_AREA $LIB_AREA/../../dw/syn_ver/$DB_PATH"
set target_library "$TARGET_LIB_NAME"
set synthetic_library [list dw_foundation.sldb]
set link_library "$TARGET_LIB_NAME dw_foundation.sldb"
analyze-f    sverilog-lib    WORK    $SRC_PATH/modulo97_split_accumulate.v
analyze-f    sverilog-lib    WORK    $SRC_PATH/modulo97_sa_top.v
elaborate modulo97_sa_top
create_clock-name clk_in-period 10 clk
link
compile_ultra-area_high_effort_script-no_boundary_optimization-no_autoungroup-scan
report_area-nosplit-hierarchy-designware>$REPORT_PATH/area.rpt 2A Example Verilog Code and Synthesis Constraints for Implementation Using Built-In Verilog Modulo (%) Operator:

```
module modulo97_operator_top
    (input clk, input rst_n, input [15:0] n_in,
        output reg [3:0] mod9_reg,
        output reg [2:0] mod7_reg
    );
reg [15:0] N;
always@(posedge clk or negedge rst_n)
    begin
        if (!rst_n)
            N <= 16'd0;
        else
            N <= n_in;
    end
wire [3:0] mudulo9_result;
wire [2:0] mudulo7_result;
```

```
modulo97_operator m97_op (.N16(N),
.modulo9_result(mudulo9_result),
.modulo7_result(mudulo7_result));
always@(posedge clk or negedge rst_n)
        begin
            if (!rst_n)
                begin mod9_reg <= 4'd0 ; mod7_reg <= 3'd0; end
            else
                begin mod9_reg <= mudulo9_result ;
                    mod7_reg <= mudulo7_result;
                end
        end
endmodule
module modulo97_operator ( input [15:0] N16,
                          output wire [3:0] modulo9_result ,
                          output wire [2:0] modulo7_result);
assign modulo9_result = N16 % 4'd9;
assign modulo7_result = N16 % 4'd7;
endmodule.
```

Essential Design Compiler Constraints for Synthesis:
remove_design-all
set search_path ". $LIB_AREA $LIB_AREA/../../dw/syn_ver/$DB_PATH"
set target_library "$TARGET_LIB_NAME"
set synthetic_library [list dw_foundation.sldb]
set link_library "$TARGET_LIB_NAME dw_foundation.sldb"
analyze-f    sverilog-lib    WORK    $SRC_PATH/modulo97_operator.v
analyze-f    sverilog-lib    WORK    $SRC_PATH/modulo97_operator_top.v
elaborate modulo97_operator_top
create_clock-name clk_in-period 10 clk
link
compile_ultra-area_high_effort_script-no_boundary_optimization-no_autoungroup-scan
report_area-nosplit-hierarchy-designware>$REPORT_PATH/area.rpt
3A Example Verilog Code and Synthesis Constraints for Implementation Using Synopsys Designware Component Instantiation:

```
module modulo97_dw_top
    (input clk, input rst_n, input [15:0] n_in,
        output reg [3:0] mod9_reg,
        output reg [2:0] mod7_reg
    );
reg [15:0] N;
always@(posedge clk or negedge rst_n)
        begin
            if (!rst_n)
                N <= 16'd0;
            else
                N <= n_in;
        end
wire [3:0] mudulo9_result;
wire [2:0] mudulo7_result;
modulo97_dw m97_dw(.N16(N),
.modulo9_result(mudulo9_result),
.modulo7_result(mudulo7_result));
always@(posedge clk or negedge rst_n)
        begin
            if (!rst_n)
                begin mod9_reg <= 4'd0 ; mod7_reg <= 3'd0; end
            else
                begin mod9_reg <= mudulo9_result ;
                    mod7_reg <= mudulo7_result;
                end
        end
endmodule
module modulo97_dw ( input [15:0] N16,
                    output wire [3:0] modulo9_result ,
                    output wire [2:0] modulo7_result);
DW_div #(.a_width(16),.b_width(4)) mod9
(.a(N16),.b(4'd9),.remainder(modulo9_result),.quotient( ),.divide_by_0( ));
DW_div #(.a_width(16),.b_width(3)) mod7
(.a(N16),.b(3'd7),.remainder(modulo7_result),.quotient( ),.divide_by_0( ));
endmodule
```

Essential Design Compiler Constraints for Synthesis:
remove_design-all
set search_path ". $LIB_AREA $LIB_AREA/../../dw/syn_ver/$DB_PATH"
set target_library "$TARGET_LIB_NAME"
set synthetic_library [list dw_foundation.sldb]
set link_library "$TARGET_LIB_NAME dw_foundation.sldb"
analyze-f    sverilog-lib    WORK    $SRC_PATH/modulo97_dw.v
analyze-f    sverilog-lib    WORK    $SRC_PATH/modulo97_dw_top.v
elaborate modulo97_dw_top
create_clock-name clk_in-period 10 clk
link
compile_ultra-area_high_effort_script-no_boundary_optimization-no_autoungroup-scan
report_area-nosplit-hierarchy-designware>$REPORT_PATH/area.rpt Summary of Results Comparing the Three Implementations:

The Verilog code using the three different implementations were fed to design compiler tool and the results of synthesis are summarized below in Table 1, which shows comparative results of implementation of modulo9 and modulo7 computation block based on architecture in FIG. 8.

As it can be seen, the implementation of the scheme presented in this patent results in a significant lower Area and lower number cell instances (Row 4 and 5) compared to the other methods.

TABLE 1

| | Results | | |
|---|---|---|---|
| Comparison Criteria | Split and Accumulate operation as presented in this Patent | Using verilog modulo operator | Instantiating design ware component directly. |
| Number of bits for the unsigned input | 16 bit | 16 bit | 16 bit |
| Verilog code | As shown in Comparison-1A | As shown in Comparison-2A | As shown in Comparison-3A |
| Synthesis constraints for design compiler tool | No area constraints. Only defined a clock constraint of 100 MHz No wire load specified | No area constraints. Only defined a clock constraint of 100 MHz No wire load specified | No area constraints. Only defined a clock constraint of 100 MHz No wire load specified |

TABLE 1-continued

| | Results | | |
|---|---|---|---|
| Comparison Criteria | Split and Accumulate operation as presented in this Patent | Using verilog modulo operator | Instantiating design ware component directly. |
| Area estimated after synthesis | Combinational area: 3173.760075<br>Buf/Inv area: 184.320007<br>Noncombinational area: 3444.479874<br>Net Interconnect area: undefined (No wire load specified)<br>Total cell area: 6618.239948 | Combinational area: 12021.120226<br>Buf/Inv area: 1232.640047<br>Noncombinational area: 3824.639954<br>Net Interconnect area: undefined (No wire load specified)<br>Total cell area: 15845.760180 | Combinational area: 11491.200214<br>Buf/Inv area: 1186.560045<br>Noncombinational area: 3818.879883<br>Net Interconnect area: undefined (No wire load specified)<br>Total cell area: 15310.080097 |
| Number of library cell instances excluding the flops used to flop the inputs/output. | 98 | 451 | 440 |

Further Application of the Split-and-Accumulate Method:

In this disclosure, the split-and-accumulate method has been used to explain the scheme for computing modulo9 and modulo7 on unsigned number. However the scheme is not limited to applications to find modulo9 and modulo7. It can effectively be used for finding results of modulo(x) and modulo(x+2) on unsigned numbers, where $x=2^n-1$ ($n$ is a non-zero positive integer).

Depending on value of x, the implementation of the 'Final modx and mod(x+2) block' as shown in FIG. 7 will slightly vary.

For example, the 'split-and-accumulate' scheme presented in this disclosure can be used with minor modification to find result of modulo3 and modulo5 operation on unsigned number. The minor modifications that would need to be done will be on the final computation blocks (shown as colored squares in FIG. 7) and the point where virtual "split" operation is done to derive Lrem, such that $0 \leq Lrem \leq 15$.

Figure 9:
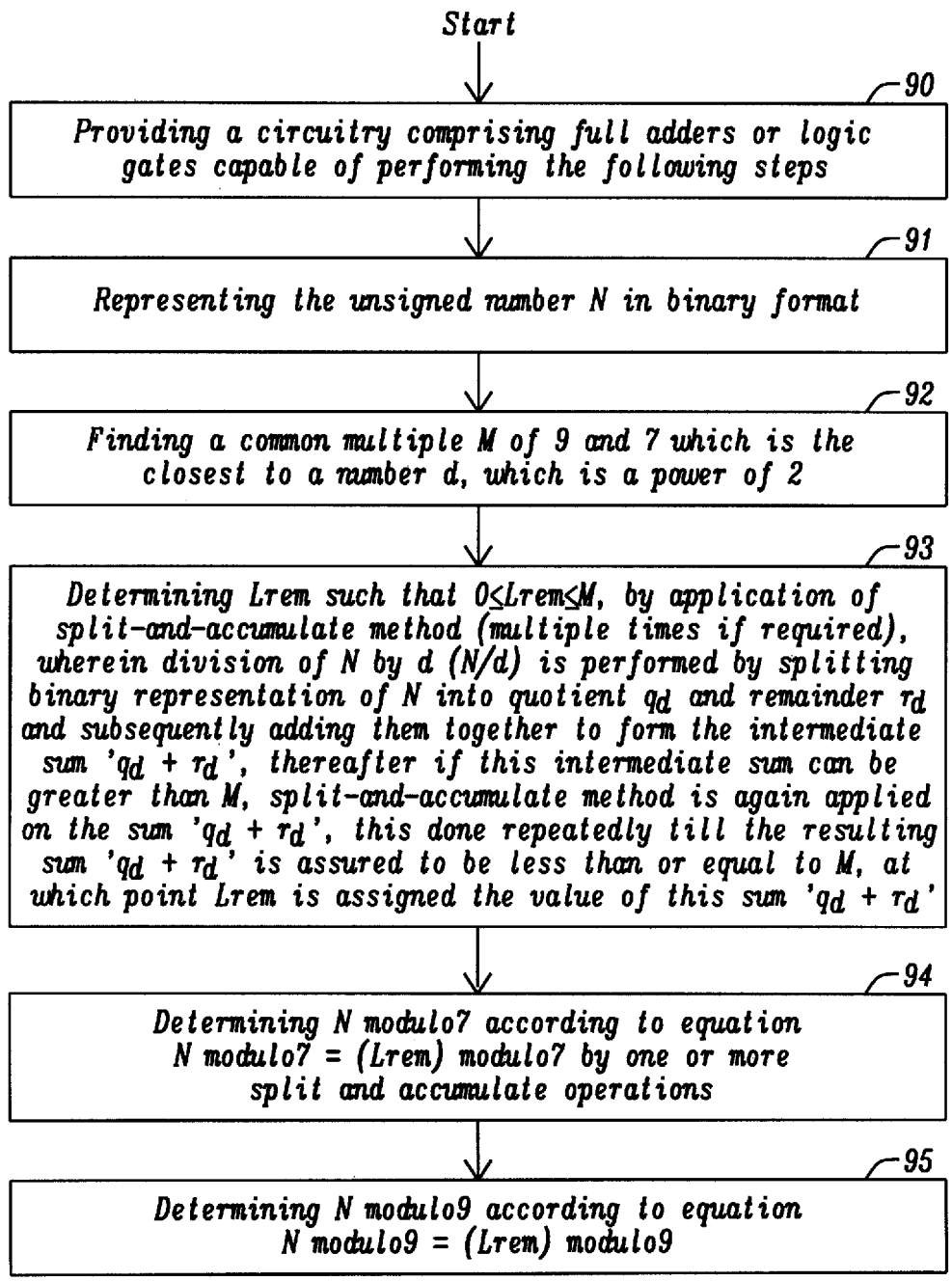
FIG. 9 shows a conceptual level flowchart of the method for obtaining simultaneous results of modulo7 and modulo9 operation on an unsigned number N. Steps marked in 94 and 95 though represented sequentially, actually happen simultaneously.

FIG. 9 shows a flowchart of a method for obtaining simultaneous results of modulo7 and modulo9 operation on an unsigned number N.

A first step 90, shows providing a circuitry comprising full adders or logic gates capable of performing the following steps. The following step 91 shows representing the unsigned number N in binary format. Step 92 illustrates finding a common multiple M of 9 and 7 which is the closest to a number d, which is a power of 2. Step 93 shows determining Lrem such that $0 \leq Lrem \leq M$, by application of split-and-accumulate method multiple times if required, wherein division of N by d (N/d) is performed by splitting binary representation of N into quotient $q_d$ and remainder $r_d$, and subsequently adding them together to form the intermediate sum '$q_d+r_d$'; thereafter if this intermediate sum can be greater than M, split-and-accumulate method is applied again on the sum '$q_d+r_d$', this done repeatedly till the resulting sum '$q_d+r_d$' is assured to be less than or equal to M, at which point Lrem is assigned the value of this sum '$q_d+r_d$'. Step 94 depicts determining N modulo7 according to equation N modulo7=(Lrem) modulo 7 by one or more split-and-accumulate operations. Finally Step 95 shows determining N modulo9 according to equation N modulo9=(Lrem) modulo 9 by one or more split-and-accumulate operations. Though step 95 is shown as following Step 94 in FIG. 9, in the circuit implementation described in this disclosure these steps happen simultaneously.

Figure 10:
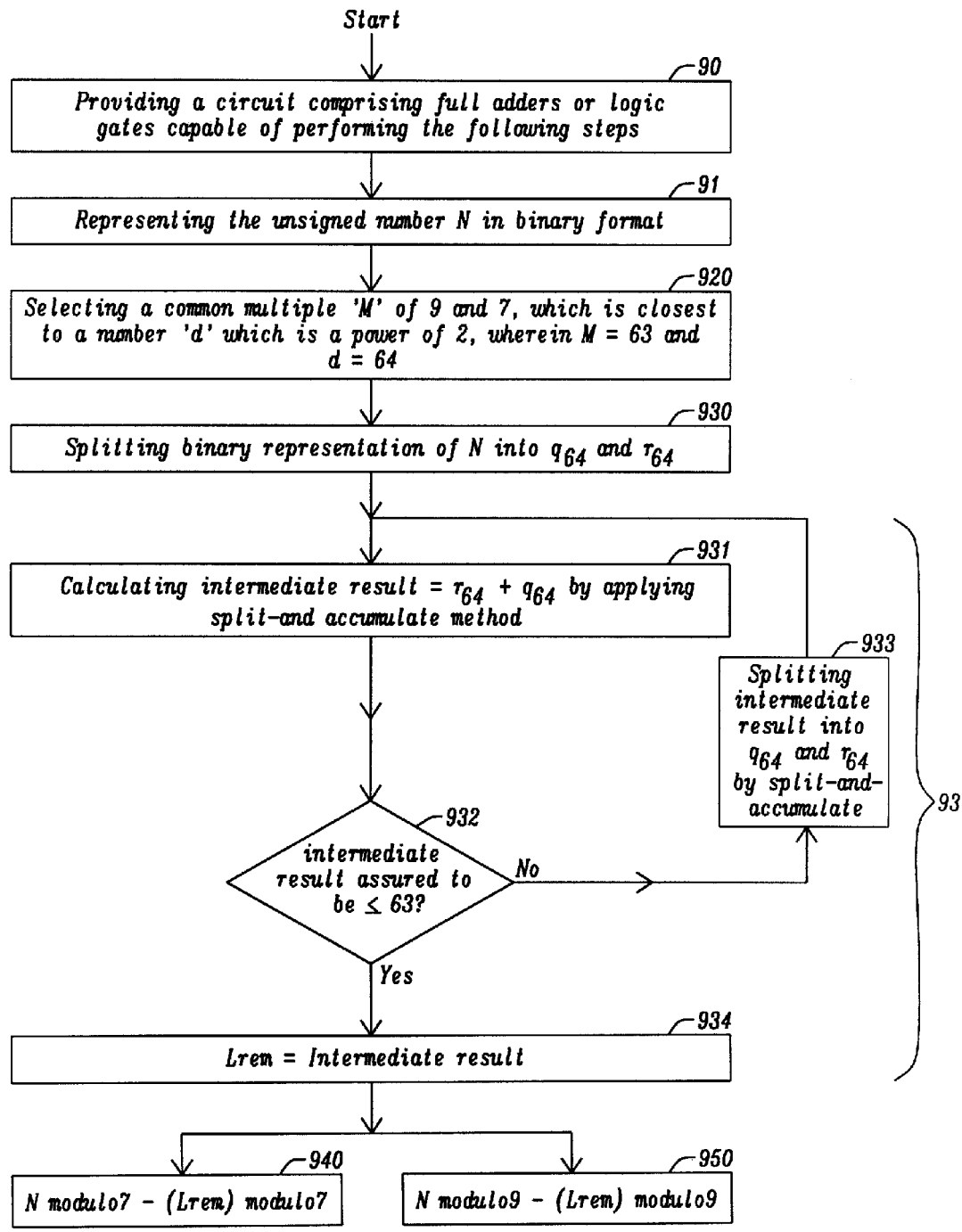
FIG. 10 shows a more elaborate flowchart based on FIG. 9, which is used for realization of the circuit shown in FIG. 6 and FIG. 7.

FIG. 10, shows an elaborated implementation level flow chart of a method, based on FIG. 9. The first two steps of this method are identical to the first two steps 90 and 91 of the method illustrated in FIG. 9.

Step 920 of FIG. 10 shows selecting a common multiple 'M' of 9 and 7, which is closest to a number 'd' which is a power of 2, wherein M=63 and d=64. The difference of step 920 to step 92 of FIG. 9 is that M=63 and d=64 has been selected. Step 93 of FIG. 9 has been split into five steps 930 to 934. Step 930 teaches splitting binary representation of N into $q_{64}$ and $r_{64}$. Step 931 illustrates calculation of Intermediate result by adding $q_{64}$ and $r_{64}$. Step 932 illustrates a check if "intermediate result" is assured to be $\leq 63$ and, if it is not so, go to step 933, else go to step 934. Step 933 depicts splitting "intermediate result" into $q_{64}$ and $r_{64}$ and the process flow goes back to step 931. Step 934 shows Lrem="intermediate result". In steps 940 and 950 the values of N modulo7=(Lrem) modulo7 and respectively N modulo9=(Lrem) modulo9 are simultaneously calculated.

In summary, the method and circuits presented in this disclosure have the following advantages.

a) Shared use of a significant amount of logic for calculating modulo9 and modulo7. This results in reduction in silicon area and will be advantageous for area sensitive digital Chips.

b) Results of modulo9 and modulo7 are simultaneously available and can be independently accessed.

c) Scalable architecture to find modulo9 and modulo7 on large numbers.

d) Easy to implement and very generic. It does not require complex logic cells or hard macros.

e) Generic solution which can be targeted to most ASIC target libraries and FPGAs.

f) Flexible to use as "only modulo9" or "only modulo7" or "modulo9 and modulo7" calculation block.

While the invention has been particularly shown and described with reference to the preferred embodiments thereof, it will be understood by those skilled in the art that various changes in form and details may be made without departing from the spirit and scope of the invention.

What is claimed is:

1. A method to obtain simultaneous results of modulo7 and modulo9 operation on an unsigned number N, the method comprising the steps of:
   (1) representing the unsigned number N in binary format;
   (2) Finding-finding a common multiple 'M' of 9 and 7 which is the closest to a number "d", d being a power of 2;
   (3) determining Lrem such that $0 \leq Lrem \leq M$, by application of the split-and-accumulate method multiple times if required, wherein division of N by d (N/d) is performed by splitting binary representation of N into quotient $q_d$ and remainder $r_d$, and subsequently adding them together to form the intermediate sum '$q_d+r_d$';

thereafter if this intermediate sum is greater than M, the split-and-accumulate method is applied again on the sum '$q_d+r_d$', this is done repeatedly till the resulting sum '$q_d+r_d$' is assured to be less than or equal to M, at which point Lrem is assigned the value of this sum '$q_d+r_d$';

(4) determining N modulo7 according to equation N modulo7=(Lrem) modulo 7 by one or more split-and-accumulate operations (5) determining N modulo9 according to equation N modulo9=(Lrem) modulo 9 by one or more split-and-accumulate operations and (6) providing a circuitry comprising full adders and logic gates capable of performing full-addition operations, comparison and multiplexing functions, configured to perform steps 3-5.

2. The method of claim 1, wherein the determination of N modulo7 by one or more split-and-accumulate operations further comprises the steps of:

(7) dividing Lrem by 8 to get a quotient $q_8$ and remainder $r_8$;

(8) accumulating division result by adding quotient $q_8$ and remainder $r_8$ to get a binary interim result IR1; and (9) finding the binary value IR2 by the adding Least significant three bits of the interim result IR1 to the Most significant bit of IR1, wherein, if the three bits of the binary value IR2 is 3'd7 then N modulo7 is zero, else the N modulo 7 value is given by the 3 bits of IR2.

3. The method of claim 1, wherein the determination of N modulo9 by one or more split-and-accumulate operations further comprises the steps of:

(10) dividing Lrem by 8 to get a quotient $q_8$ and a remainder $r_8$; and

(11) comparing quotient $q_8$ with remainder $r_8$, wherein, if $q_8$ is greater than the remainder $r_8$ then N modulo9 is the result of subtracting the difference ($q_8-r_8$) from 9, else, if $q_8$ is less than or equal to the remainder $r_8$ then N modulo9 is the difference $r_8-q_8$;

(12) providing the circuitry comprising subtractors configured to perform step 11.

4. The method of claim 1, wherein the determination of N modulo9 by one or more split-and-accumulate operations further comprises the steps of:

(13) providing the circuitry further comprising a 4-bit 2's complement generator;

(14) dividing Lrem by 8 to get a quotient $q_8$ and a remainder $r_8$;

(15) comparing quotient $q_8$ with remainder $r_8$, wherein, if $q_8$ is greater than the remainder $r_8$ then N modulo9 is the result of adding $q'_8+r_8+4'd9$, wherein $q'_8$ represents the 4-bit 2's complement of $q_8$, or, if $q_8$ is smaller than or equal to the remainder $r_8$ then N modulo9 is the result of the sum ($r_8+q'_8$).

5. The method of claim 1, wherein the method is used for finding results of modulo(x) and modulo(x+2) on unsigned numbers, wherein $x=2^n-1$ and wherein n is a non-zero positive integer.

6. The method of claim 1, wherein a part of the logic gates for calculating modulo9 and modulo7 is shared.

7. A method to obtain a result of a modulo9 operation on an unsigned number N, the method comprising the steps of:

(1) representing the unsigned number N in binary format;

(2) finding multiple 'M' of 9 which is the closest to a number "d", d being a power of 2;

(3) determining Lrem such that 0≤Lrem≤M, by application of split-and-accumulate method multiple times if required, wherein division of N by d (N/d) is performed by splitting binary representation of N into quotient $q_d$ and remainder $r_d$, and subsequently adding them together to form the intermediate sum '$q_d+r_d$'; thereafter if this intermediate sum is greater than M, split-and-accumulate method is applied again on the sum '$q_d+r_d$', this done repeatedly till the resulting sum '$q_d+r_d$' is assured to be less than or equal to M, at which point Lrem is assigned the value of this sum '$q_d+r_d$; and (4) determining N modulo9 according to equation N modulo9=(Lrem) modulo 9 by one or more split-and-accumulate operations;

(5) providing a circuitry comprising full adders and logic gates capable of performing full-addition operations, comparison and multiplexing functions, configured to perform steps 3 and 4.

8. The method of claim 7, wherein the determination of N modulo9 by one or more split-and-accumulate operations further comprises the steps of:

(10) providing the circuitry further comprising subtractors;

(11) dividing Lrem by 8 to get a quotient $q_8$ and a remainder $r_8$; and

(12) comparing quotient $q_8$ with remainder $r_8$, wherein, if $q_8$ is greater than the remainder $r_8$ then N modulo9 is the result of subtracting the difference ($q_8-r_8$) from 9, else, if $q_8$ is less than or equal to the remainder $r_8$ then N modulo9 is the difference $r_8-q_8$.

9. The method of claim 7, wherein the determination of N modulo9 by one or more split-and-accumulate operations further comprises the steps of:

(13) providing the circuitry further comprising a 4-bit 2's complement generator;

(14) dividing Lrem by 8 to get a quotient $q_8$ and a remainder $r_8$;

(15) comparing quotient $q_8$ with remainder $r_8$, wherein, if $q_8$ is greater than the remainder $r_8$ then N modulo9 is the result of adding $q'_8+r_8+4'd9$, wherein $q'_8$ represents the 4-bit 2's complement of $q_8$, or, if $q_8$ is smaller than or equal to the remainder $r_8$ then N modulo9 is the result of the sum ($r_8+q'_8$).

10. A circuit capable of obtaining simultaneous results of modulo7 and modulo9 operation on an unsigned binary number N, comprising a circuitry capable of calculating Lrem such that 0≤Lrem≤M, wherein M is a multiple of 9 and 7 which is the closest to the number d, which is a power of 2, wherein the circuitry comprises full adders or logic gates configured to calculate Lrem using repeatedly a split-and accumulate method till Lrem reaches a value, which is less than or equal to the number M;

a circuitry capable of calculating N modulo7 based on the value of said Lrem, wherein the circuitry comprises full adders, a comparator, and a multiplexer configured to perform a split operation to find a quotient $q_8$ and a remainder $r_8$ of a division of Lrem by 8, followed by an accumulate operation adding quotient $q_8$ and remainder $r_8$ to get a binary interim result IR1, furthermore followed by a second split-and-accumulate operation wherein the most significant bit of IR1 is added to the Least significant three bits of IR1 to get an interim value IR2, wherein, if IR2 has a value of 3d'7, N modulo 7 is zero, else Nmodulo 7 equals IR2; and a circuitry capable of calculating N modulo9, based on the split operation to find the quotient $q_8$ and the remainder $r_8$ of a division of Lrem by 8 calculated by the circuitry capable of calculating N modulo 7, wherein the circuitry capable of calculating N modulo9 comprises a comparator, a multiplexer and subtractors and is configured, if the quotient $q_8$ is greater than the remainder $r_8$ to calculate N modulo9=9−($q_8$−$r_8$), else to calculate N modulo9=$r_8$−$q_8$.

11. The circuit of claim 10 wherein the circuit is targeted to ASIC libraries and FPGAs.

12. The circuit of claim 10, wherein the circuit is configured to finding results of modulo(x) and modulo(x+2) on unsigned numbers, wherein x=$2^n$−1 and wherein n is a non-zero positive integer.

13. The circuit of claim 10, wherein the circuit is designed using a hardware description language.

14. A circuit capable of obtaining a result of modulo9 operation on an unsigned binary number N, comprising
- a circuitry capable of calculating Lrem such that 0≤Lrem≤M, wherein M is a multiple of 9 which is the closest to the number d, which is a power of 2, wherein the circuitry comprises full adders or logic gates configured to calculate Lrem using repeatedly a split-and accumulate method till Lrem reaches a value, which is less than or equal to the number M; and
- a circuitry capable of calculating N modulo9, based on the value of said Lrem, wherein the circuitry capable of calculating N modulo9 comprises a comparator, a multiplexer and subtractors configured to perform the split operation to find the quotient $q_8$ and the remainder $r_8$ of a division of Lrem by 8, wherein the circuitry capable of calculating N modulo9 is configured, if the quotient $q_8$ is greater than the remainder $r_8$ to calculate N modulo9=9−($q_8$−$r_8$), else to calculate N modulo9=$r_8$−$q_8$.

15. The circuit of claim 14 wherein the circuit is targeted to ASIC libraries and FPGAs.

16. The circuit of claim 14, wherein the circuit is designed using a hardware description language.

17. A circuit to obtain simultaneous results of modulo7 and modulo9 operation on an unsigned binary number N, comprising
- a circuitry capable of calculating Lrem such that 0≤Lrem≤M, wherein M is a multiple of 9 and 7 which is the closest to the number d, which is a power of 2, wherein the circuitry comprises full adders or logic gates configured to calculate Lrem using repeatedly a split-and accumulate method till Lrem reaches a value, which is less than or equal to the number M;
- a circuitry capable of calculating N modulo7 based on the value of said Lrem, wherein the circuitry comprises full adders, a comparator, and a multiplexer configured to perform a split operation to find a quotient $q_8$ and a remainder $r_8$ of a division of Lrem by 8, followed by an accumulate operation adding quotient $q_8$ and remainder $r_8$ to get a binary interim result IR1, furthermore followed by a second split-and-accumulate operation wherein the most significant bit of IR1 is added to the Least significant three bits of IR1 to get an interim value IR2, wherein, if IR2 has a value of 3d'7, N modulo 7 is zero, else N modulo 7 equals IR2; and
- a circuitry capable of calculating N modulo9, based on the split operation to find the quotient $q_8$ and the remainder $r_8$ of a division by 8 calculated by the circuitry capable of calculating N modulo 7, wherein the circuitry capable of calculating N modulo9 comprises a comparator, a multiplexer, full adders and a 4-bit 2's complement generator, and is configured, if $q_8$ is greater than the remainder $r_8$ to calculate N modulo9=$q'_8$+$r_8$+4'd9, wherein $q'_8$ represents the 4-bit 2's complement of $q_8$, or, if $q_8$ is smaller than or equal to the remainder $r_8$ then to calculate N modulo9=$r_8$+$q'_8$.

18. The circuit of claim 17 wherein the circuit is targeted to ASIC libraries and FPGAs.

19. The circuit of claim 17, wherein the circuit is configured to finding results of modulo(x) and modulo(x+2) on unsigned numbers, wherein x=$2^n$−1 and wherein n is a non-zero positive integer.

20. The circuit of claim 17, wherein the circuit is designed using a hardware description language.

21. A circuit to obtain a result of modulo9 operation on an unsigned binary number N, comprising
- a circuitry capable of calculating Lrem such that 0≤Lrem≤M, wherein M is a multiple of 9 which is the closest to the number d, which is a power of 2, wherein the circuitry comprises full adders or logic gates configured to calculate Lrem using repeatedly a split-and accumulate method till Lrem reaches a value, which is less than or equal to the number M;
- a circuitry capable of calculating N modulo9, based on the split operation to find the quotient $q_8$ and the remainder $r_8$ of a division of Lrem by 8, wherein the circuitry capable of calculating N modulo9 comprises a comparator, a multiplexer, full adders and a 4-bit 2's complement generator, and is configured, if $q_8$ is greater than the remainder $r_8$ to calculate N modulo9=$q'_8$+$r_8$+4'd9, wherein $q'_8$ represents the 4-bit 2's complement of $q_8$, or, if $q_8$ is smaller than or equal to the remainder $r_8$ then to calculate N modulo9=$r_8$+$q'_8$.

22. The circuit of claim 21 wherein the circuit is targeted to ASIC libraries and FPGAs.

23. The circuit of claim 21, wherein the circuit is designed using a hardware description language.

24. A method to obtain a result of a modulo7 operation on an unsigned number N, the method comprising the steps of:
(1) representing the unsigned number N in binary format;
(2) finding a multiple 'M' of 7 which is the closest to a number "d", d being a power of 2;
(3) determining Lrem such that 0≤Lrem≤M, by application of split-and-accumulate method multiple times if required, wherein division of N by d (N/d) is performed by splitting binary representation of N into quotient $q_d$ and remainder $r_d$, and subsequently adding them together to form the intermediate sum '$q_d$+$r_d$'; thereafter if this intermediate sum is greater than M, split-and-accumulate method is applied again on the sum '$q_d$+$r_d$', this done repeatedly till the resulting sum '$q_d$+$r_d$' is assured to be less than or equal to M, at which point Lrem is assigned the value of this sum '$q_d$+$r_d$'; and
(4) determining N modulo7 according to equation N modulo7=(Lrem) modulo 7 by one or more split-and-accumulate operations;
(5) providing a circuitry comprising full adders and logic gates capable of performing full-addition operations, comparison and multiplexing functions, configured to perform steps 3 and 4.

25. The method of claim 24, wherein the determination of N modulo7 by one or more split-and-accumulate operations further comprises the steps of:
(7) dividing Lrem by 8 to get a quotient $q_8$ and remainder $r_8$;
(8) accumulating division result by adding quotient $q_8$ and remainder $r_8$ to get a binary interim result IR1; and
(9) finding the binary value IR2 by the adding Least significant three bits of the interim result IR1 to the Most significant bit of IR1, wherein, if the three bits of the binary value IR2 is 3'd7 then N modulo7 is zero, else the N modulo 7 value is given by the 3 bits of IR2.

26. A circuit capable of obtaining a result of a modulo7 operation on an unsigned binary number N, comprising a circuitry capable of calculating Lrem such that $0 \leq Lrem \leq M$, wherein M is a multiple 7 which is the closest to the number d, which is a power of 2, wherein the circuitry comprises full adders or logic gates configured to calculate Lrem using repeatedly a split-and accumulate method till Lrem reaches a value, which is less than or equal to the number M; and a circuitry capable of calculating N modulo7 based on the value of said Lrem, wherein the circuitry comprises full adders, a comparator, and a multiplexer configured to perform a split operation to find a quotient $q_8$ and a remainder $r_8$ of a division of Lrem by 8, followed by an accumulate operation adding quotient $q_8$ and remainder $r_8$ to get a binary interim result IR1, furthermore followed by a second split-and-accumulate operation wherein the most significant bit of IR1 is added to the Least significant three bits of IR1 to get an interim value IR2, wherein, if IR2 has a value of 3d'7, N modulo 7 is zero, else Nmodulo 7 equals IR2.

27. The circuit of claim 26 wherein the circuit is targeted to ASIC libraries and FPGAs.

28. The circuit of claim 26, wherein the circuit is designed using a hardware description language.

\* \* \* \* \*